United States Patent [19]

Sasaki et al.

[11] Patent Number: 5,083,071
[45] Date of Patent: Jan. 21, 1992

[54] SPINDLE CONTROL SYSTEM

[75] Inventors: Takao Sasaki, Hachioji; Kentaro Fujibayashi, Musashino; Morimasa Sato, Hachioji, all of Japan

[73] Assignee: Fanuc Ltd., Minamitsuru, Japan

[21] Appl. No.: 476,415

[22] PCT Filed: Sep. 29, 1989

[86] PCT No.: PCT/JP89/01002
§ 371 Date: May 29, 1990
§ 102(e) Date: May 29, 1990

[87] PCT Pub. No.: WO90/04816
PCT Pub. Date: May 3, 1990

[30] Foreign Application Priority Data

Oct. 20, 1988 [JP] Japan .................. 63-264874

[51] Int. Cl.⁵ ............................... G05B 19/18
[52] U.S. Cl. ................. 318/569; 318/568.1; 318/568.2; 364/474.23

[58] Field of Search ............ 318/569, 568.1, 568.2; 364/474.23

[56] References Cited

U.S. PATENT DOCUMENTS 4,963,803 10/1990 Kokura ........................ 318/569

Primary Examiner—William M. Shoop, Jr.
Assistant Examiner—Saul M. Bergmann
Attorney, Agent, or Firm—Staas & Halsey

[57] ABSTRACT

Disclosed is a spindle control system of a numerical control apparatus capable of independently controlling a plurality of spindles by a plurality of paths. Connecting relationships between respective paths (11 to 14) and respective spindles (61 to 65) are defined in a region (3), the content of the region (3) is changed by a machining program to change the spindles (61 to 65) to be controlled by the respective paths (11 to 14), whereby a more effectively machining can be realized.

8 Claims, 3 Drawing Sheets 5,083,071

SPINDLE CONTROL SYSTEM

BACKGROUND OF THE INVENTION

1. Field of the Invention

The present invention relates to a spindle control system of a numerical control apparatus, and more specifically, to a spindle control system by which spindles controlled by respective paths, or path controllers, are changed.

2. Description of the Related Art

Recent machine tools are complex machines provided with a number of independently controllable spindles, and are widely used to improve the machining efficiency and to simultaneously machine complex configurations.

In such a complex machine, an assembly of axes is controlled by a single path controller (path), which is a numerical control apparatus. Conventionally, a first path controls only a first spindle and a second path controls only a second spindle.

In conventional systems, however, since a second path cannot control a first spindle and a first path cannot control a second spindle, any improvement of the machining efficiency is limited even if a plurality of spindles are provided.

SUMMARY OF THE INVENTION

Taking the above into consideration, an object of the present invention is to provide a spindle control system by which the spindles to be controlled by respective paths can be changed.

To solve the above problem, in accordance with the present invention, there is provided a spindle control system in a numerical control apparatus capable of independently controlling a plurality of spindles by a plurality of paths, the system comprising the steps of defining connecting relationships between the paths and the respective spindles in a definition region in the NC apparatus, and changing the content of the predetermined region by a machining program, whereby the spindles to be controlled by the respective paths are changed.

The connecting relationship between the respective paths and the respective spindles is defined in the definition region of the numerical control apparatus, and the change of the content of the predetermined region effected by the machining program enables the connecting relationships between the paths and the spindles to be changed, whereby a more effective machining can be realized.

BRIEF DESCRIPTION OF THE DRAWINGS

FIG. 1 (b) is a conceptual diagram showing the arrangement of the numerical control apparatus of FIG. 1 (a) when the defined content thereof is changed.

DESCRIPTION OF THE PREFERRED EMBODIMENT

An embodiment of the present invention will be described below with reference to drawings.

Figure 1A:
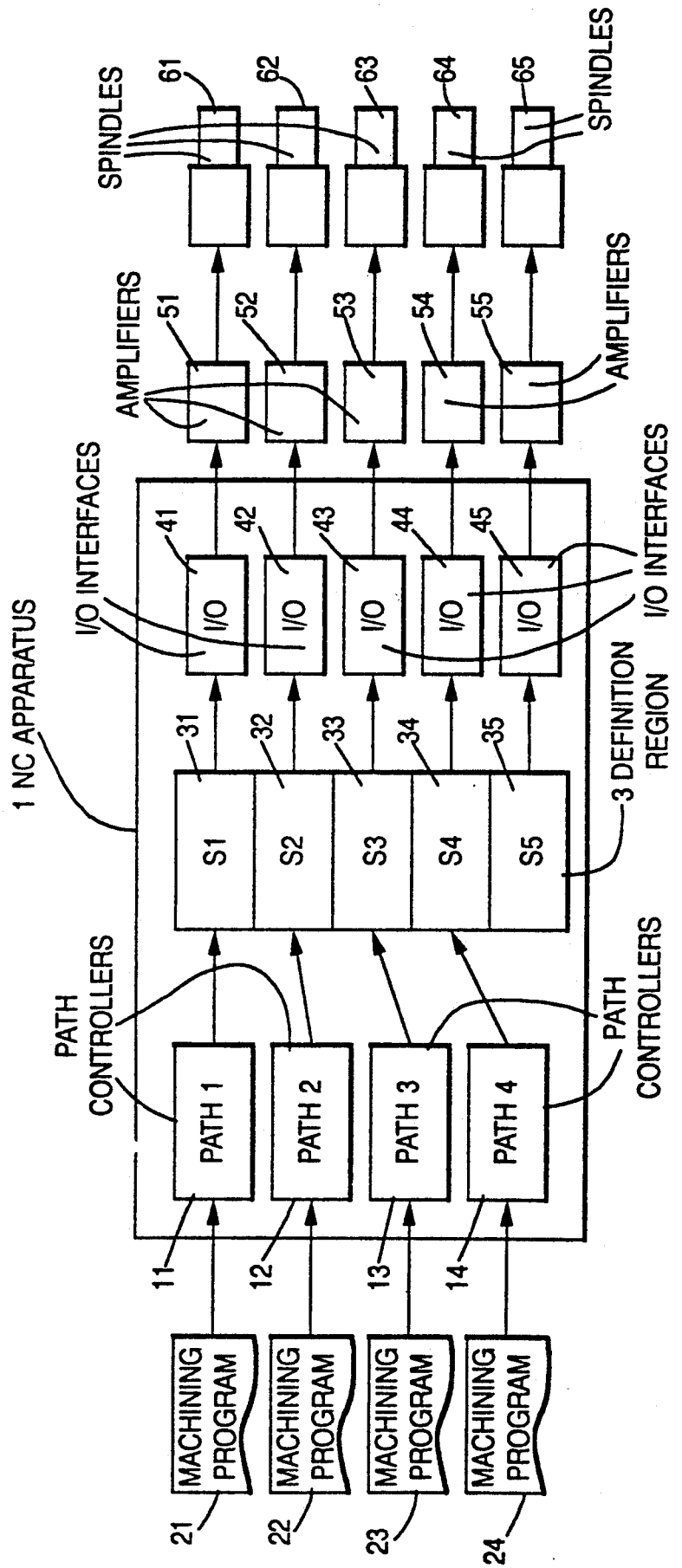
FIG. 1 (a) is a conceptual diagram showing the arrangement of a numerical control apparatus embodying the present invention.
Figure 1B:
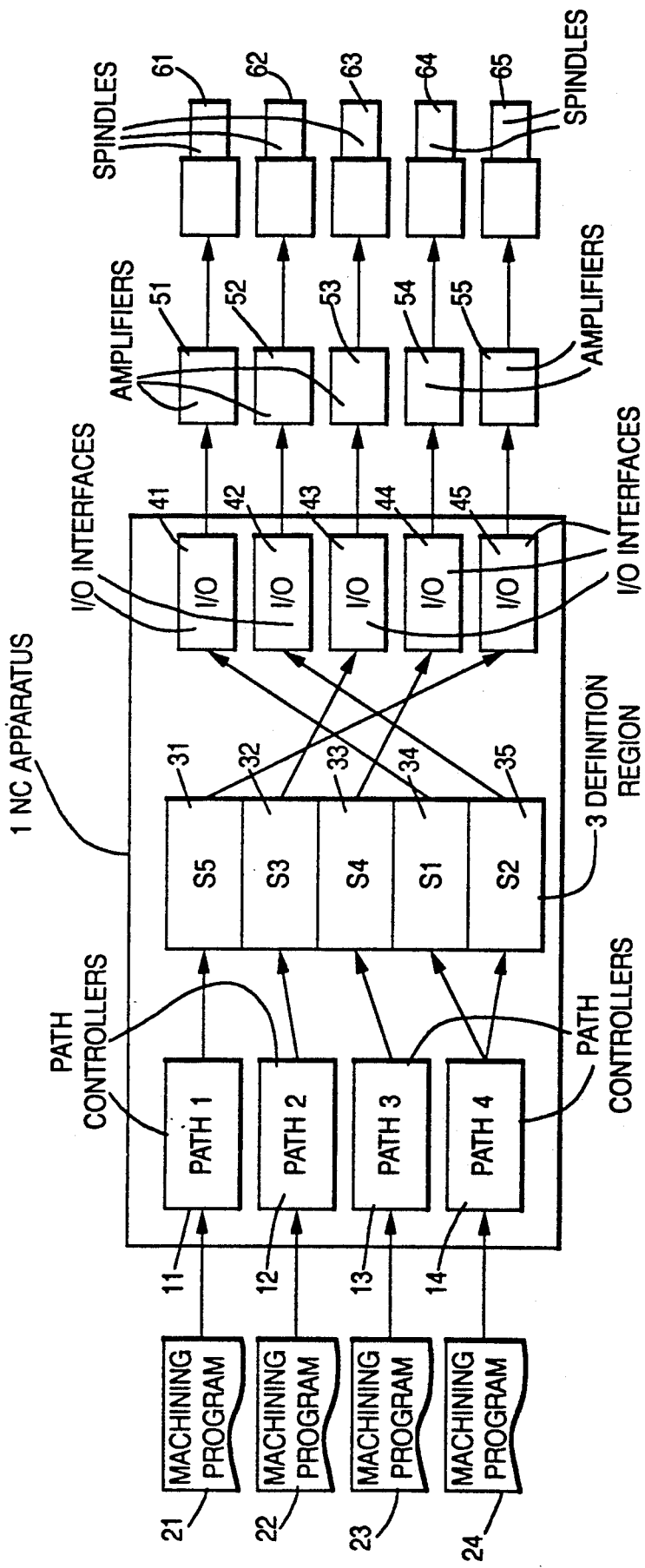

FIGS. 1 (a) and (b) are conceptual diagrams showing the arrangement of a numerical control apparatus embodying the present invention. In FIG. 1 (a), 1 designates the numerical control apparatus (CNC), 21 to 24 designate machining programs, 11 to 14 designate path controllers (path) 3 designates a definition region divided into sections 31 to 35 by which connecting relationships between paths 1 (11) to path 4 (14), and spindles to be described below, are defined: the content of S1, S2..., and S5 being defined in the definition region, respectively.

The content of the definition of S1 defines the path 1 (11) to be connected to an I/O interface 41, the content of the definition S2 defines the path 2 (12) to be connected to an I/O interface 42, the content of the definition S3 defines the path 3 (13) to be connected to an I/O interface 43, and the content of SY defines the path 4 (14) to be connected to I/O interface 44; These contents are defined by a machining program 2. Note that, in FIG. 1(a) since the content of the definition S5 does not define a path to be controlled, the spindle connected thereto is not driven.

51 to 55 denote amplifiers and designated at 61 to 65 are spindles.

Figure 2:
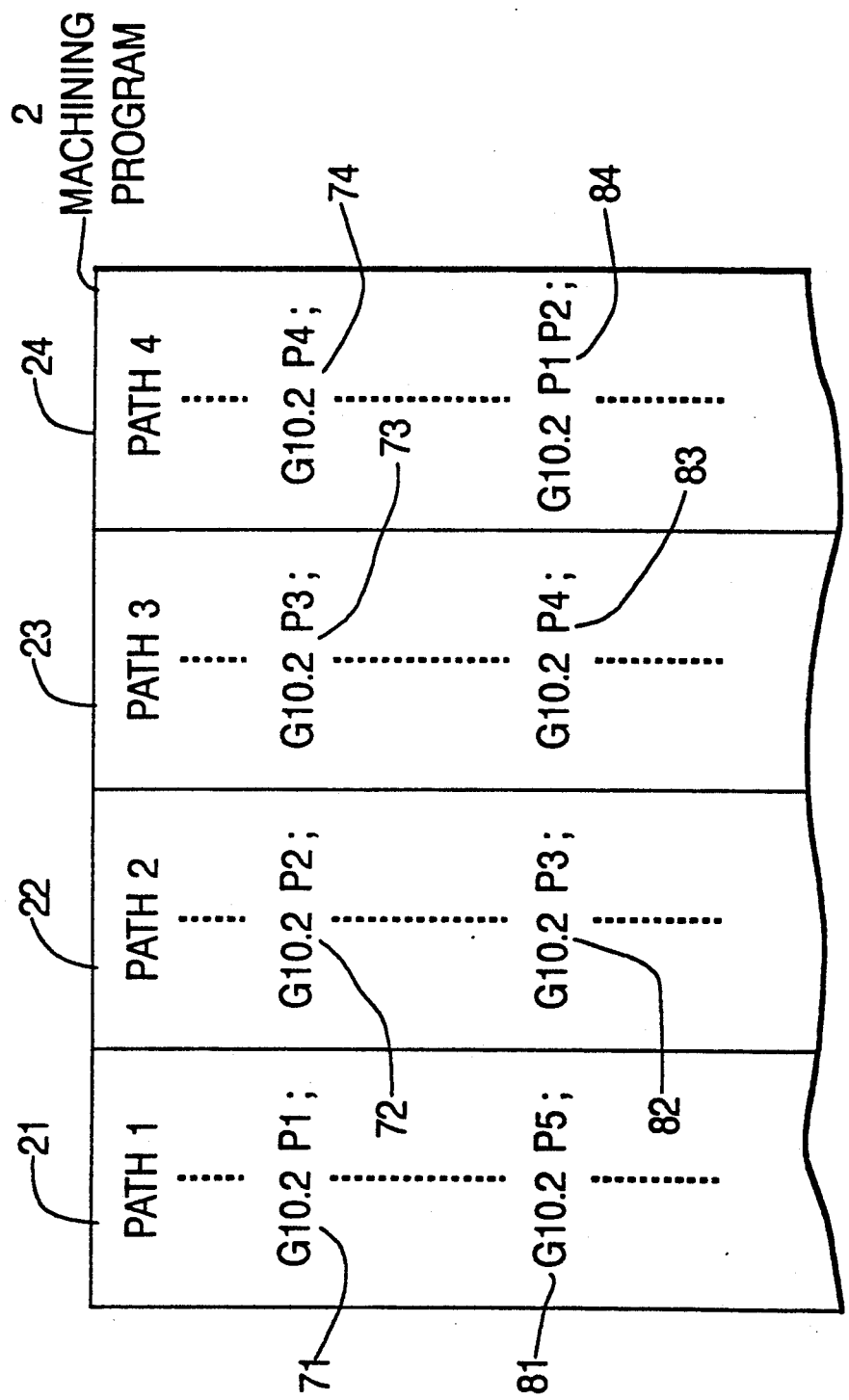
FIG. 2 is an example of a machining program executed in a spindle control system according to the present invention.

FIG. 2 is an example of a machining program used in the spindle control system according to the present invention, wherein 2 designates the machining program including respective machining programs 21 to 24, wherein 21 designates a machining program for the path 1 (11), 22 designates a machining program for the path 2 (12), ..., and 24 designates a machining program for the path 4 (14). These machining programs are executed in parallel.

Designated at 71 is a G code command for selecting spindles, wherein "P1" means that the spindle 61 is selected and the path 1 (11) controls the spindle 61 in response to the command. Similarly, the paths 2 (12), 3 (13), and 4 (14) select the spindles 62, 63, and 64, respectively, in response to G code commands 72 to 74, whereby the operation is carried out in the arrangement shown in FIG. 1 (a).

Designated at 81 is a G code command for selecting the spindle 65, and the path 1 (11) controls the spindle 65 in response to this command and subsequent commands. Similarly, the paths 2 (12) and 3 (13) control the spindles 63 and 64, respectively, in response to G codes 82 and 83 and subsequent commands. Designated at 84 is a G code command for selecting the spindles 61 and 62, whereby the path 4 (14) can simultaneously control the spindles 61 and 62.

FIG. 1 (b) shows the arrangement of the numerical control apparatus when the G code commands 81 to 84 are executed. Those parts in FIG. 1 (b) which have the same functions as those in FIG. 1 (a) are designated by identical reference numerals in FIG. 1 (b). Note, however, that the content of the definition regions 31 to 35 in FIG. 1 (b) is different from that of FIG. 1 (a).

More specifically, the content for connecting the path 1 (11) to an I/O interface 45 is defined in the definition region 31. Similarly, the content for connecting the paths 2 (12) and 3 (13) to the I/O interfaces 43 and an I/O interface 44, respectively, is defined in the definition regions 32 and 33. The content for connecting the path 4 (14) to the I/O interfaces 41 and 42 is defined in the definition regions 34 and 35.

As a result, the paths 1 (11), 2 (12), and 3 (13) can control the spindle 65, 63, and 64, respectively. Further, the path 4 (14) can simultaneously control the spindles 61 and 62.

Note that the above combination of paths and spindles is only an example, and these combinations can be arbitrarily changed by a machining program in addition to the above. Further, the number of paths and spindles can be changed as necessary.

As described above, according to the present invention, since spindles to be controlled by respective paths can be changed by a machining program, a more effectively machining can be realized.

We claim:

1. A spindle control system of a numerical control apparatus capable of independently controlling a plurality of spindles by a plurality of path controllers, comprising the steps of:
   (a) defining connecting relationships between said path controllers and said respective spindles by storing the connecting relationships in a definition region in the numerical control apparatus.
   (b) changing the content of said definition region by a machining program, whereby said spindles are connected to be controlled by other of said path controllers.

2. A spindle control system of a numerical control apparatus capable of independently controlling a plurality of spindles by a plurality of path controllers, comprising the steps of:
   (a) defining connecting relationships between said path controllers and said respective spindles in a definition region in the numerical control apparatus; and
   (b) changing the content of said definition region by a machining program, whereby said spindles are connected to be controlled by other of said path controllers, wherein said machining program is a command by a G code.

3. A spindle control system of a numerical control apparatus capable of independently controlling a plurality of spindles by a plurality of path controllers, comprising the steps of:
   (a) defining connecting relationships between said path controllers and said respective spindles in a definition region in the numerical control apparatus, wherein the definition region is interposed between said path controllers and the I/O interfaces for said respective spindles; and
   (b) changing the content of said definition region by a machining program, whereby said spindles are connected to be controlled by other of said path controllers.

4. A spindle control system of a numerical control apparatus capable of independently controlling a plurality of spindles by a plurality of path controllers, comprising the steps of:
   (a) defining connecting relationships between said path controllers and said respective spindles in a definition region in the numerical control apparatus, wherein said path controllers can be connected to said plurality of spindles which are not connected to other paths; and
   (b) changing the content of said definition region by a machining program, whereby said spindles are connected to be controlled by other of said path controllers.

5. A method of controlling spindles with path controllers comprising the steps of:
   (a) defining in a storage the spindles to be controlled by the path controllers;
   (b) changing the spindles in the storage to be controlled by different ones of the path controllers; and
   (c) controlling the spindles with the ones of the path controllers as defined in the storage.

6. A method according to claim 5, wherein step (a) defining multiple spindles to be controlled by one of the path controllers.

7. A spindle control system for controlling spindles, comprising:
   path controllers controlling the spindles; and
   storage means, operatively connected to said path controllers, storing a machining program and defining the spindles to be controlled by each of the path controllers.

8. A spindle control system for controlling spindles, comprising:
   machine storage storing machining programs;
   a numerical control apparatus operatively connected to said machine storage and comprising:
     path controllers corresponding respectively to the machining programs, and
     definition storage operatively connected to the path controllers, and storing connecting relationships between the path controllers and the spindles; and
   I/O interfaces, operatively connected to the spindles and to the definition storage, responsive to the connecting relationships.

* * * * *

UNITED STATES PATENT AND TRADEMARK OFFICE
CERTIFICATE OF CORRECTION

PATENT NO. : 5,083,071
DATED : January 21, 1992
INVENTOR(S) : Takao Sasaki et al.

It is certified that error appears in the above-identified patent and that said Letters Patent is hereby corrected as shown below:

Col. 2, line 6, "(path)" should be --(path),--;

line 18, "44;" should be --44.--;

line 23, "designated at" should be deleted;

line 24, "are" should be --denote--.

Signed and Sealed this

Eighth Day of June, 1993

Attest:

MICHAEL K. KIRK

Attesting Officer

Acting Commissioner of Patents and Trademarks